US012087521B2

(12) United States Patent
Sobbe

(10) Patent No.: US 12,087,521 B2
(45) Date of Patent: Sep. 10, 2024

(54) EMERGENCY-STOP SWITCH AND MACHINE WITH AN EMERGENCY-STOP SWITCH

(71) Applicant: Becker Mining Systems AG, Friedrichsthal (DE)

(72) Inventor: Thomas Sobbe, Dorsten (DE)

(73) Assignee: Becker Mining Systems AG, Friedrichsthal (DE)

( * ) Notice: Subject to any disclaimer, the term of this patent is extended or adjusted under 35 U.S.C. 154(b) by 175 days.

(21) Appl. No.: 17/785,719

(22) PCT Filed: Nov. 11, 2020

(86) PCT No.: PCT/EP2020/081685
§ 371 (c)(1),
(2) Date: Jun. 15, 2022

(87) PCT Pub. No.: WO2021/121785
PCT Pub. Date: Jun. 24, 2021

(65) Prior Publication Data

US 2023/0051205 A1 Feb. 16, 2023

(30) Foreign Application Priority Data

Dec. 19, 2019 (DE) ..................... 10 2019 135 227.4

(51) Int. Cl.
*H01H 3/02* (2006.01)

(52) U.S. Cl.
CPC ................................. *H01H 3/0226* (2013.01)

(58) Field of Classification Search
CPC ...... H01H 3/0226; H01H 15/102; H01H 3/42; H01H 2003/323; H01H 11/0062; H01H 17/08; H02H 7/00
See application file for complete search history.

(56) References Cited

U.S. PATENT DOCUMENTS 5,041,705 A * 8/1991 Piccoli ................. H01H 3/0226
200/543
5,665,947 A * 9/1997 Falcon ................. H01H 3/0226
200/61.18

(Continued)

FOREIGN PATENT DOCUMENTS

DE 2810745 B1 6/1979
DE 69619128 T2 9/2002

(Continued)

OTHER PUBLICATIONS

German Examination Report, pp. 1-7, no date.

(Continued)

*Primary Examiner* — Edwin A. Leon
(74) *Attorney, Agent, or Firm* — BOND, SCHOENECK & KING, PLLC; George R. McGuire

(57) ABSTRACT

The invention relates to an emergency stop switch, having: a switch mechanism with a manually operable switch and with a first contact element which is operatively connected to the switch, wherein the switch is configured to bring the first contact element into contact with a second contact element to trigger an emergency stop function. A cable pull mechanism with a switch tongue guided in a switch tongue guide is connected to a first end of a cable, wherein a switch tongue spring preloads the switch tongue during operation in a direction away from the cable. The cable is connected on its second end with preload to an equalizing spring during operation, wherein the first contact element is operatively connected to the switch tongue. When the preloaded cable is pulled, is guided in the switch tongue guide in the direction of the cable, opposing a spring force of the switch tongue spring, and in the process brings the first contact element into contact with the second contact element in order to trigger the emergency stop function by the cable pull mechanism.

16 Claims, 2 Drawing Sheets

(56) References Cited

U.S. PATENT DOCUMENTS

| | | | | |
|---|---|---|---|---|
| 5,821,488 | A * | 10/1998 | Falcon | H01H 3/0226 200/61.18 |
| 8,089,012 | B2 * | 1/2012 | Mohtasham | H01H 3/0226 200/61.18 |
| 10,490,370 | B2 * | 11/2019 | Kim | H01H 17/08 |
| 2009/0083956 | A1 | 4/2009 | Ulfik et al. | |
| 2010/0044204 | A1 | 2/2010 | Mohtasham et al. | |
| 2013/0229069 | A1 | 9/2013 | Freitag et al. | |

FOREIGN PATENT DOCUMENTS

| | | | |
|---|---|---|---|
| DE | 202007013591 | U1 | 1/2008 |
| DE | 102010060506 | A1 | 5/2012 |
| GB | 2216726 | A | 10/1989 |
| SU | 741334 | A1 | 6/1980 |
| SU | 1621118 | A1 | 1/1991 |
| WO | 2008047102 | A1 | 4/2008 |

OTHER PUBLICATIONS

International Search Report and Written Opinion, PCT/EP2020/081685, Filed Nov. 11, 2020. Mailing date of Search Report, Feb. 12, 2021. pp. 1-8.

Russian Examination Report, pp. 1-7.

* cited by examiner

EMERGENCY-STOP SWITCH AND MACHINE WITH AN EMERGENCY-STOP SWITCH

CROSS REFERENCE TO RELATED APPLICATIONS

This is a National Stage Application filed under 35 U.S.C. 371 based on International Patent Application No. PCT/EP2020/081685, filed on Nov. 11, 2020, which claims priority to German Application Number 10 2019 135 227.4, filed Dec. 19, 2019, the entire disclosures of each of which are hereby incorporated herein by reference in their entirety.

BACKGROUND

The invention relates to an emergency stop switch and to a machine having such an emergency stop switch.

Emergency stop switches known from the prior art typically have a switch mechanism. The switch mechanism has a switch that is connected to a first contact element. The switch is configured to bring the first contact element into contact with a second contact element when the switch is actuated, in order to trigger an emergency stop function by means of the switch mechanism. This brings a machine equipped with the emergency stop switch to a standstill.

The object of the invention is to provide a simple, compact, and safe emergency stop switch.

SUMMARY OF THE INVENTION

This problem is solved by an emergency stop switch that has: a switch mechanism with a manually operable switch and a first contact element that is operatively connected to the switch, the switch being configured to bring the first contact element into contact with a second contact element when the switch is actuated in order to trigger an emergency stop function, and a cable pull mechanism with a switch tongue guided in a switch tongue guide, the switch tongue being configured to be connected to a first end of a cable, wherein a switch tongue spring preloads the switch tongue during operation in a direction away from the cable, and wherein the cable is connected with preload during operation to an equalizing spring on its second end, wherein the first contact element is operatively connected to the switch tongue in such a way that the switch tongue, when the preloaded cable is pulled, is guided in the switch tongue guide in the direction of the cable, opposing a spring force of the switch tongue spring, and in the process brings the first contact element into contact with the second contact element in order to trigger the emergency stop function by means of the cable pull mechanism.

By means of the emergency stop switch according to the invention, an emergency stop function can be triggered either by manually actuating the switch using the switch mechanism, or by pulling on the cable using the cable pull mechanism. The emergency stop switch according to the invention thus provides two mechanisms for triggering the emergency stop function. This enables the emergency stop function to be triggered quickly and safely by an operator in a manner adapted to the given situation. Coupled to a machine, the emergency stop switch can be manually actuated via the switch or via the cable by the operator of the machine or by a further person. As a result, the machine is switched from an operating mode to an emergency stop in order to bring the machine to a standstill in a dangerous situation.

In addition, the cable pull mechanism provides a further means of triggering the emergency stop function when the operator is not near the switch, but is near the cable—which can be used to shut down an area, for example. This increases the operability and security, since the emergency stop switch will trigger the emergency stop function properly.

In addition, since the switch mechanism and the cable pull mechanism are coupled to each other via the first contact element, the structure of the emergency stop switch according to the invention is compact and simple.

The mentioned operation is an operation of the emergency stop switch in which the switch tongue is connected to the first end of the cable and is connected with preload to the equalizing spring, and the cable is connected with preload on its second end to the equalizing spring. The cable and/or the equalizing spring can in particular be designed to be exchangeable.

In particular, the switch tongue can be connected to the first end of the cable. Furthermore, in particular, the switch tongue can be preloaded in the direction away from the cable by means of the switch tongue spring. In particular, the second end of the cable can also be connected with preload to an equalizing spring during operation.

To preload the switch tongue by means of the switch tongue spring, the switch tongue can be placed against the switch tongue spring.

The second contact element can be part of a switch unit. The switch unit can trigger the emergency stop function when the second contact element is actuated. For this purpose, the second contact element can be configured to switch an electrical contact of the switch unit, and thereby trigger the emergency stop function.

The cable can be designed in particular as a wire cable. As a result, the cable is designed to be robust and resistant to mechanical damage, as a result of which the risk of the cable tearing can be reduced. Furthermore, the switch tongue can be connected to a wire eye. The cable can be attached to the wire eye; this is particularly simple and safe.

A plain bearing can be arranged on the switch tongue guide. It enables a defined and lubricated sliding of the switch tongue in the switch tongue guide.

Provision can be made for the first contact element and the switch tongue to be operatively connected to each other by means of an actuator. The actuator can in particular be designed in such a way that it can be moved along the switch tongue. The actuator can in particular be designed to slide and/or roll along the switch tongue. The actuator can be arranged in such a way that it is in permanent contact, in the operating mode, with the first contact element and the switch tongue. Furthermore, the actuator can be mounted in a manner allowing sliding in the direction from the switch tongue to the second contact element or—in other words—along a first axis along which the switch mechanism acts. Pulling the cable causes the switch tongue to be guided in its switch tongue guide, and the actuator to move along the switch tongue and the first contact element, which in turn can bring the first contact element in the direction of the second contact element.

It can be provided that the actuator is designed as a idler wheel. Alternatively, the actuator can be designed, for example, as a sliding element. The idler wheel can be formed by a cylindrical body which is rotatably mounted on a longitudinal center axis of the cylindrical body. The idler wheel can be arranged in such a way that it is in permanent contact, in the operating mode, with the first contact element and the switch tongue. Furthermore, the idler wheel can be mounted so as to be displaceable in the direction from the switch tongue to the second contact element, or, in other words, along a first axis along which the switch mechanism acts. Pulling the cable causes the switch tongue to be guided in its switch tongue guide, and the idler wheel to move along the switch tongue and the first contact element, which in turn can bring the first contact element in the direction of the second contact element.

It can be provided that the actuator is arranged in a recess of the switch tongue. The recess is designed in such a way that when the actuator is situated in the recess, there is a distance between the first contact element, on which the actuator rests, and the second contact element. Pulling the cable causes the switch tongue to be guided in its switch tongue guide, and the actuator to move along the switch tongue and out of the recess. The distance between the first contact element and the second contact element is thereby reduced until the first contact element finally hits the second contact element, and triggers the emergency stop function.

Due to the fact that the first contact element and the switch tongue are operatively connected to each other by means of the actuator, in particular the idler wheel—and in particular can be operatively connected to each other solely by means of the actuator—the contact between the first contact element and the second contact element, produced by pulling the cable, is not interrupted when the cable is released. It is true that the switch tongue spring, compressed by the pulling of the cable, forces the switch tongue back into its starting position as before the cable was pulled—that is, in the direction away from the cable. However, as a result, only the actuator moves back into the recess. The first contact element continues to make contact with the second contact element. This ensures that the machine remains in an emergency stop once the emergency stop function has been triggered by pulling the cable. This prevents unintentional start-up of the machine caused by releasing the cable; also, the cable does not have to be held to ensure that the machine comes to a standstill. In order to return to the operating mode of the machine or reverse the emergency stop, the switch of the switch mechanism simply has to be pulled back or disengaged. This is because the first contact element is also connected to the switch, such that when the emergency stop function is triggered by pulling the cable, the switch is also actuated or engaged. This ensures that the operating mode is only resumed when safe operation is possible.

Provision can be made in this case for the recess to have two flanks running obliquely to a longitudinal axis of the switch tongue. The actuator can be configured to travel up along a first flank of the two flanks when the cable is pulled, and/or along a second flank of the two flanks when the cable breaks, in order to move the first contact element to the second contact element. The two flanks can be formed in particular on the same side of the switch tongue. The two flanks can be arranged opposite each other. The two flanks can run and/or rise in opposite directions. There may be a gap between the two flanks. The gap can be formed by a straight portion on the switch tongue. The flanks can in particular run obliquely to the longitudinal axis at an angle in the range from 15° to 75°, in particular in the range from 30° to 60°. This provides sufficient resistance to the movement of actuator.

Provision can also be made for the recess to be designed in the shape of a trapezoid. The trapezoidal shape can have the flanks described above. In this sense, the recess represents a trapezoidal shape. It is advantageous but not necessary for the recess to correspond mathematically exactly to a trapezoidal shape. As such, the trapezoidal recess need not be formed from straight lines, but can also have rounded lines and rounded corners, as long as it represents a trapezoidal shape in the broadest sense. The trapezoidal shape allows the actuator to be moved easily on a (straight or rounded) flank of the trapezoidal recess of the switch tongue. The distance between the first contact element and the second contact element can be established as a function of the travel of the switch tongue in the guide path, as a linear function, using flanks of the trapezoidal shape running obliquely. This enables a particularly simple design. A line of symmetry of the trapezoidal recess can be located to correspond with a first axis along which the switch mechanism acts. As a result, the actuator lies optimally in the recess.

Provision can also be made for the switch tongue spring to be preloaded. In particular, the switch tongue spring can be preloaded with a spring force which is sufficient for the switch tongue spring to guide the switch tongue in the switch tongue guide in the direction away from the cable, and far enough that the actuator moves out of the recess, if the cable breaks. This is particularly advantageous if the recess is designed in the shape of a trapezoid and/or with the two flanks running obliquely to the longitudinal axis. This is because the functionality for the emergency stop function is provided on a first flank of the trapezoidal shape by pulling the cable, because the first actuator moves up along the first flank and moves the first contact element to the second contact element. On a second flank of the recess, the functionality for the emergency stop function is provided by a break of the cable, because the actuator moves up the second incline and moves the first contact element to the second contact element. Accordingly, it can be provided that the switch tongue spring is preloaded with a spring force which is sufficient for the switch tongue spring to guide the switch tongue in the switch tongue guide in the direction away from the cable, and far enough that the actuator moves along the second flank out of the recess, if the cable breaks.

A special feature is that, if the preloaded switch tongue spring has been decompressed as a result of the cable breaking, the switch can no longer be reset or disengaged. This is because the switch tongue is then reset in the direction opposite that of the cable, such that, due to a lack of preload on the cable and the switch tongue spring, the actuator can no longer fall into the recess, and the actuator blocks the return of the switch because it is positioned between the first contact element and the switch tongue. This prevents resetting the switch for an unwanted operation of the machine in the operating mode if the cable is broken. Consequently, the broken cable must first be replaced before operation can be resumed.

Provision can also be made for the switch to be in the form of a mushroom button. The mushroom button can be actuated to initiate the emergency stop function simply by pressing—in the process, locking into a depressed position. The mushroom button can also be easily released by pulling it back up, to exit the emergency stop and/or to enter the operating mode, thereby releasing it.

Provision can also be made for the first contact element to be in the form of a contact plate. This provides a large contact area for contacting the second contact element. Furthermore, the actuator can move particularly well on the contact plate. The contact plate can be circular, for example.

It can also be provided that the switch tongue spring is designed as a spiral spring which is arranged concentrically around the switch tongue. This enables a particularly compact construction of the cable pull mechanism.

It can also be provided that the switch tongue guide is formed in a switch tongue housing, the switch tongue housing having a contact portion against which the switch tongue spring is applied. The switch tongue spring can be easily compressed and tensioned against the contact portion when the cable is pulled, to subsequently cause the switch tongue to reset. Furthermore, the contact portion being formed inside the switch tongue housing also enables a compact construction of the cable pull mechanism.

The switch tongue housing can be formed from a first switch tongue housing part and a second switch tongue housing part. The switch tongue can be fixed in the second switch tongue housing part by means of a fixation, for example by means of a locking pin. The fixation of the switch tongue by means of the locking pin causes the second switch tongue housing part to be moved away from the first switch tongue housing part when the cable is pulled. As a result, the switch tongue can be moved along the second axis in a simple manner. A bellows can be arranged between the switch tongue housing parts, which bellows can expand and contract to follow the movement of the switch tongue, and to provide a dust seal.

It can also be provided that the switch tongue has a support portion on which the switch tongue spring is supported. The support portion can be designed as a peripheral thickening of the switch tongue. In particular, the switch tongue spring can be supported against the support portion by means of a disk spring. The switch tongue spring can thus be simply supported against the support portion to allow compression. This enables a compact structure of the cable pull mechanism.

Furthermore, the switch tongue can have a guide bolt guided in a longitudinal guide of the cable pull mechanism. In particular, the guide bolt can be guided in a longitudinal guide of the switch tongue housing. The longitudinal guide can be formed as an elongate recess in the switch tongue housing. The guide bolt can be arranged in particular on the support portion. This prevents the switch tongue and the cable from rotating.

Furthermore, it can be provided that the equalizing spring is firmly clamped in a clamp during operation, or is configured to be firmly clamped in a clamp. This allows the cable to be easily preloaded.

Provision can furthermore be made for a first axis—along which the switch mechanism acts—and a second axis—along which the cable pull mechanism acts—to be transverse, in particular orthogonal, to each other. This creates a compact structure in which both mechanisms interact with each other in a simple manner.

Finally, it can also be provided that the switch mechanism and the cable pull mechanism are arranged in a single housing of the emergency stop switch. The housing can furthermore have at least one opening. An opening may be dedicated to the switch, which may be mounted on the housing. As such, the switch can be easily actuated from outside the housing. Furthermore, a further opening can be dedicated to the switch tongue guide, a switch tongue housing, and/or the cable. The switch tongue housing may also be mounted on the housing. This allows the cable to be easily pulled from outside the housing. The switch mechanism can be fastened, in particular screwed, to the housing, by means of a flange plate, for example. The cable pull mechanism can be attached to the housing, for example, in such a way that the switch tongue housing is inserted into the opening of the housing with a positive fit. This also enables a compact, safe and simple construction of the emergency stop switch.

Furthermore, it can be provided that the switch tongue has a marking for setting a predetermined preload of the cable, the emergency stop switch having a viewing port for reading the marking. In other words, a predetermined displacement of the switch tongue can be adjusted. As a result, the preload of the cable can be set manually to a predetermined or, in other words, a correct value. For example, the marking can be a circumferential groove or colored marking on the switch tongue. The predetermined marking can be adjusted when the marking is in a predetermined position viewable through the viewing port. This position can be reached, for example, when the marking is in a center of the viewing port. Using the marking, the point of the correct preload can then be easily identified or read off if it is in the center of the viewing port. The viewing port can be designed, for example, as a circular recess, in particular with an inspection glass. The viewing port can be formed in particular in the switch tongue housing.

The object mentioned at the outset is also achieved by a machine having the emergency stop switch, wherein the second contact element is connected to the machine in such a way that triggering the emergency stop function by means of the emergency stop switch causes the machine to come to a standstill.

The second contact element can be connected to a switch unit of the machine, as mentioned above, or the switch unit can be part of the emergency stop switch and connected to a power supply unit or a further supply unit of the machine in order to trigger an emergency stop function.

BRIEF DESCRIPTION OF THE DRAWINGS

Further details and advantageous embodiments of the invention can be found in the following description, on the basis of which one embodiment of the invention will be described and explained in more detail, wherein.

DETAILED DESCRIPTION

Figure 1:
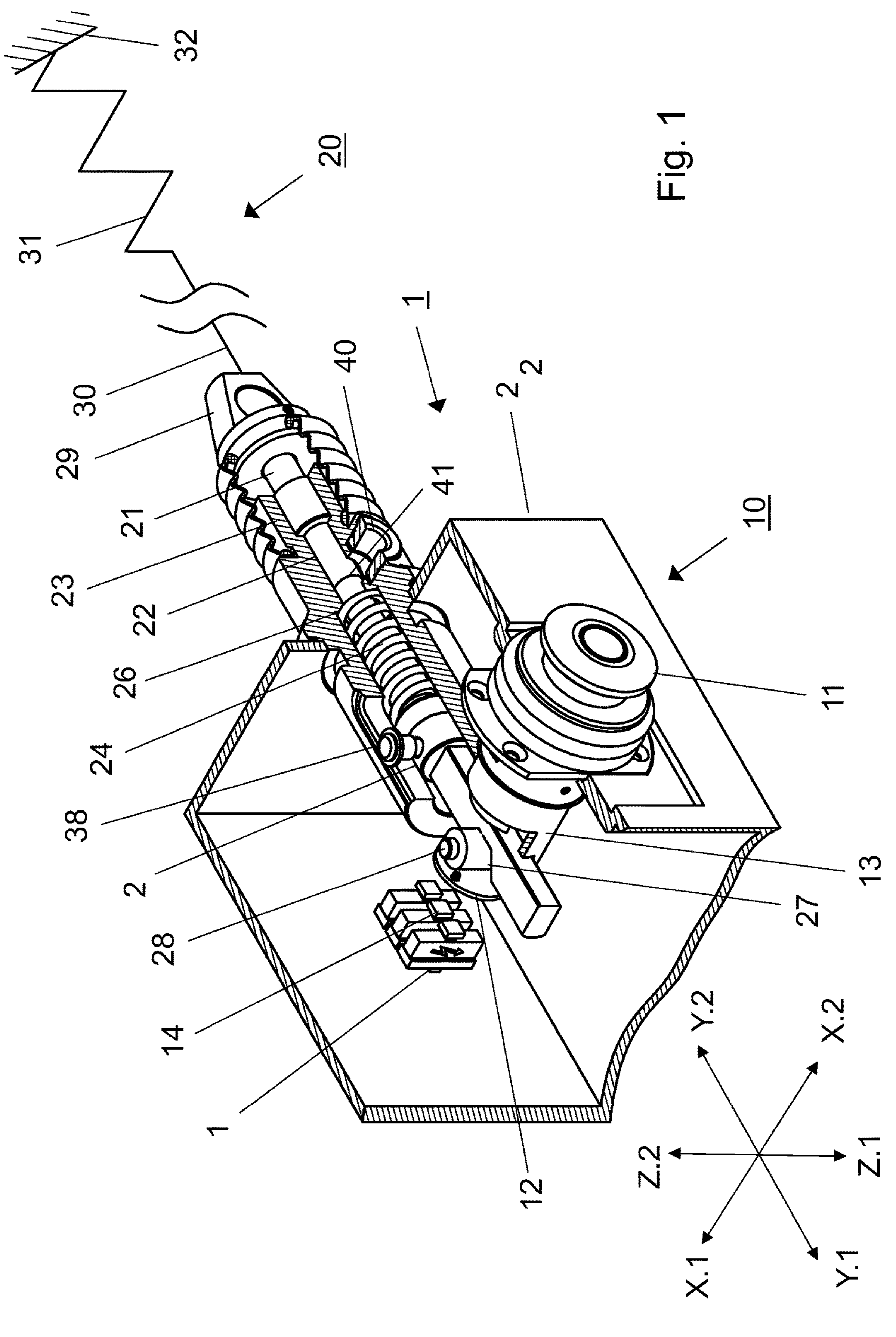
FIG. 1 shows an embodiment of an emergency stop switch in a partially cutaway, perspective side view.

The emergency stop switch 1 is in an operating mode in FIG. 1. The operating mode is a mode in which the emergency stop function is not triggered, and a machine equipped with the emergency stop switch 1 is being operated properly. In particular, it is supplied with current.

The emergency stop switch 1 has a housing 2. A switch mechanism 10 and a cable pull mechanism 20 are accommodated in the housing 2 of the emergency stop switch 1.

The switch mechanism 10 has a switch 11, which is designed as a mushroom button in the present exemplary embodiment. The switch 11 is rigidly connected to a first contact element 12 by means of a connecting part 13. In the present case, the first contact element 12 is designed as a round contact plate 12. The switch 11 can be actuated in the X.1 direction along the first X axis.

When the switch 11 is actuated due to an emergency, the connecting part 13 and the first contact element 12 are displaced in the direction X.1 along the first axis X. Due to the displacement of the contact plate 12, it comes into contact with a second contact element 14 of a switch unit 15, which is arranged on a side wall of the housing 2. This triggers an emergency stop function. For example, for a machine which is supplied with current, the power supply to the machine can be interrupted by executing the emergency stop function. This brings the machine to a standstill.

In order to deactivate the emergency stop function or to return to the operating mode, the switch 11 can be reset in the direction X.2 along the first X axis. This process releases the contact between the contact plate 12 and the second contact element 14, as a result of which the switch unit 15 enters the operating mode.

The cable pull mechanism 20 has a switch tongue 21 and a cable 30. The switch tongue 21 is connected to the first end of the cable 30 by means of a wire eye 29. Furthermore, the switch tongue 21 is guided in a switch tongue guide 22. In the present case, the switch tongue guide 22 is formed in a switch tongue housing 23. The switch tongue housing 23 encloses the switch tongue 21 in a portion close to the cable 30, and leaves the switch tongue 21 exposed in a portion remote from the cable 30.

A switch tongue spring 24 of the cable pull mechanism 20 is arranged concentrically around the switch tongue 21. The switch tongue spring 24 is supported against a support portion 25 of the switch tongue 21. In the present case, the switch tongue spring 24 is designed as a compression spring. In the present case, the support portion 25 is designed as a peripheral thickening of the switch tongue 21. Furthermore, the switch tongue spring 24 lies against a contact portion 26. In the present case, the contact portion 26 is formed in a switch tongue housing 23.

The cable 30 is also connected to an equalizing spring 31 at its second end. The equalizing spring 31 is clamped in a fixed clamp 32. The equalizing spring 31 preloads the cable 30. When the cable 30 is preloaded, the switch tongue spring 24 is compressed between the support portion 25 and the contact portion 26, and is thus preloaded.

Figure 2:
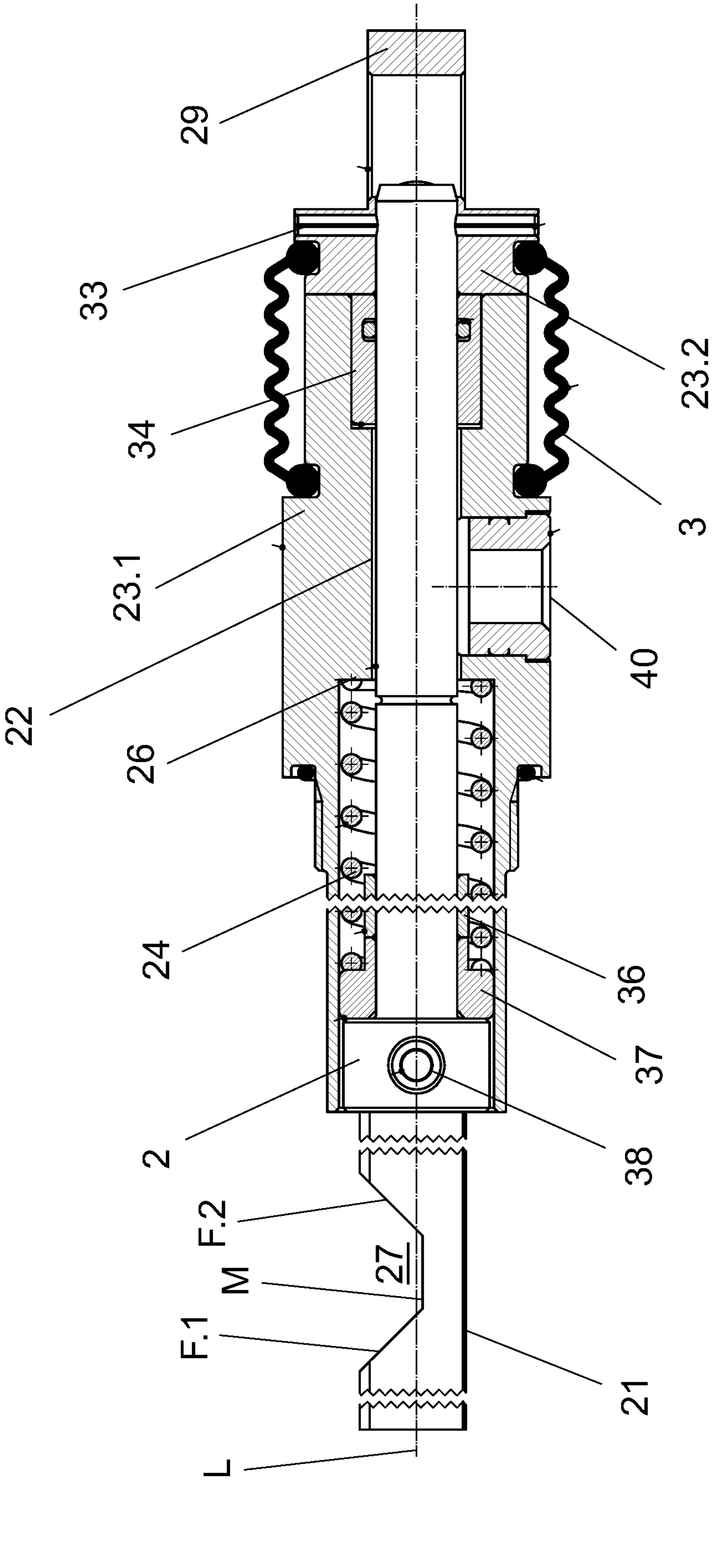
FIG. 2 is a sectional view of a part of the emergency stop switch of FIG. 1.

The switch tongue 21 also has a trapezoidal recess 27 with two flanks F.1, F.2 (see FIG. 2). The cable pull mechanism 20 has an actuator 28 arranged in the trapezoidal recess 27 in the operating mode. The actuator 28 is mounted in a manner allowing sliding along the second Y axis. In the present case, the actuator 28 is designed as an idler wheel 28. In the present case, the idler wheel 28 is mounted on the connecting part 13 of the switch mechanism 10. A longitudinal center axis of the idler wheel 28, designed as an axis of rotation, coincides with the first axis X of the switch mechanism 10.

If the cable 30 is now pulled in any direction along the first axis X, the second axis Y or the third axis Z, which are orthogonal to each other, when the emergency stop switch 1 is in the operating mode, the switch tongue 21 is pulled along its switch tongue guide 22 in the direction Y.2 along the second axis Y, and against the spring resistance of the preloaded switch tongue spring 24. As a result, the switch tongue 21 is displaced in the direction Y.2 in relation to the idler wheel 28 and the contact plate 12. The trapezoidal recess 27 with the switch tongue 21 migrates opposite the idler wheel 28 in direction Y.2 along the second axis Y. Accordingly, the idler wheel 28 rolls up the first flank F.1 of the trapezoidal recess 27 near the free end of the switch tongue 21, and thus moves in direction X.1 along the first axis X. The idler wheel 28 also rolls on the contact plate 12 and presses it in the direction of the second contact element 14 until the contact plate 12 and the second contact element 14 contact each other. As a result, the emergency stop function is triggered by means of the cable pull mechanism 20.

If the cable 30 is now released by the operator who pulled it, the shifting tongue spring 24, which is further preloaded against the spring resistance, pushes the shifting tongue 21 back in direction Y.1 along the second axis Y until the idler wheel 28 move on the first flank F.1 and in the direction X.2 along the first axis X, to once again arrive in the center of the recess 27. The cable 30, which is again tensioned by means of the equalizing spring 31, prevents the idler wheel 28 from also moving in the direction Y.2 along the second axis Y, also over the second incline. The contact plate 12 remains on the second contact element 14, such that, despite the cable being released, the operating mode does not begin, because the idler wheel 28 is not firmly connected to the contact plate 12, and merely makes contact with it when the emergency stop function is triggered.

In order to deactivate the emergency stop function or to return to the operating mode, the switch 11 must also be reset in the direction X.2 along the first X axis. This process releases the contact between the contact plate 12 and the second contact element 14, as a result of which the switch unit 15 enters the operating mode.

In addition to triggering the emergency stop function by actuating the switch 11 and pulling the cable 30, the emergency stop switch 1 has a third option for triggering the emergency stop function. This third option is a breakage of the cable 30. The emergency stop function is activated for safety reasons in this case.

If the cable 30 breaks, the preload of the cable 30 by means of the equalizing spring 31 on the switch tongue 21 is no longer applied. As a result, the preloaded shifting tongue spring 24 is completely released, such that this preload is also released, and the shifting tongue spring 24 returns the shifting tongue 21 completely in the direction Y.1 along the second axis Y. The idler wheel 28 rolls up the second flank F.2 (see FIG. 2) of the trapezoidal recess 27 and presses the contact plate 12 against the second contact element 14, as a result of which the emergency stop function is triggered.

Then the idler wheel 28 is located in the direction Y.2 along the second axis Y behind the trapezoidal recess 27 and between the switch tongue 21 and the contact plate 12. Unlike when the cable 30 is pulled, the idler wheel 28 does not return to the recess 27 after the cable 30 has been released, since no preload is available by means of the cable 30 to accomplish this, which preload would guide the switch tongue 21 in the direction Y.2 along the second axis Y. Furthermore, the switch tongue spring 24 would also have to be overcome in order to bring the recess 27 in front of the idler wheel 28. The idler wheel 28 thus blocks the mushroom button 11 from being pulled back. For safety reasons, this prevents the emergency stop switch 1 from being unblocked if the cable 30 breaks. The broken cable 30 must be replaced in order to make the emergency stop switch 1 operational again, so that it can be put into the operating mode.

As FIG. 2 shows in the view of a longitudinal section through the switch tongue 21 together with the switch tongue housing 23 of the emergency stop switch 1 from FIG. 1, the switch tongue 21 in the present case is designed as an actuating bolt which is guided in the switch tongue guide 22 in the switch tongue housing 23. At its end opposite the trapezoidal recess 27, the switch tongue 21 is connected to the wire eye 29 for the connection to the cable 30 (see FIG. 1).

The trapezoidal recess 27 has the first flank F.1 and the second flank F.2, which are formed on the same side of the switch tongue 21. The flanks F.1, F.2 are formed obliquely in opposite directions relative to a longitudinal axis L of the switch tongue 21. Between the flanks F.1, F.2, there is a central portion of the recess 27 which is straight in the present case, and in which the idler wheel 28 is situated when the cable 30 is not pulled and has not broken.

Furthermore, the switch tongue housing 23 is formed from a first switch tongue housing part 23.1 and a second switch tongue housing part 23.2. The switch tongue 21 is fixed in the wire eye 29 near the second switch tongue housing part 23.2 by means of a locking pin 33. The first switch tongue housing part 23.1 is close to the trapezoidal recess 27, and comprises the switch tongue spring 24. The fixing of the switch tongue 21 by means of the locking pin 21 causes the second switch tongue housing part 23.2 to be moved away from the first switch tongue housing part 23.1 when the cable 30 is pulled. As a result, the switch tongue 21 can be moved along the second Y axis.

A bellows 35 is arranged between the switch tongue housing parts 23.1, 23.2, which bellows can expand and contract to follow the movement of the switch tongue 21 and to provide a seal against escaping oil from a plain bearing 34 and the switch tongue guide 22. The plain bearing 34 is formed in the present case in the first switch tongue housing part 23.1, and enables the switch tongue 21 to slide in the switch tongue guide 22.

In addition, the switch tongue 21 coaxially surrounded by the switch tongue spring 24 designed as a compression spring is provided with a sleeve 36, and is supported against the support portion 25 by means of a spring plate 37. The support portion 38 has a guide pin 38. The guide pin 38 extends in a direction Z.2 along the third axis Z. The guide pin 38 is guided in a longitudinal guide of the switch tongue housing 23, as is partially visible in FIG. 1. In the present case, the longitudinal guide is designed as an elongated recess in the switch tongue housing 23, in particular in the first switch tongue housing part 23.1. This prevents rotation of the switch tongue 21 and the cable 30.

Furthermore, the switch tongue housing 23 has a viewing port 40 for reading a marking 21 arranged on the switch tongue 21. The marking 21 is arranged at a position along the switch tongue 21 such that, when the marking 21 is in the center of the viewing hole 40, a predetermined preload of the cable 30 is set.

The invention claimed is:

1. An emergency stop switch, comprising:

a switch mechanism with a manually operable switch and with a first contact element which is operatively connected to the switch, wherein the switch is configured, upon actuation of the switch, to bring the first contact element into contact with a second contact element to trigger an emergency stop function, and a cable pull mechanism with a switch tongue guided in a switch tongue guide, wherein the switch tongue is configured to be connected to a first end of a cable, wherein a switch tongue spring preloads the switch tongue during operation in a direction away from the cable, wherein the cable is connected at its second end to an equalizing spring, wherein the first contact element is operatively connected to the switch tongue, wherein the switch tongue, when the preloaded cable is pulled, is guided in the switch tongue guide in the direction of the cable, opposing a spring force of the switch tongue spring, and brings the first contact element into contact with the second contact element in order to trigger the emergency stop function by means of the cable pull mechanism.

2. The emergency stop switch according to claim 1, characterized in that the first contact element and the switch tongue are operatively connected to each other by an actuator.

3. The emergency stop switch according to claim 2, characterized in that the actuator is configured as an idler wheel.

4. The emergency stop switch according to claim 2, characterized in that the actuator is arranged in a recess in the switch tongue.

5. The emergency stop switch according to claim 4, characterized in that the recess has two flanks running obliquely to a longitudinal axis of the switch tongue.

6. The emergency stop switch according to claim 4, characterized in that the recess is trapezoidal.

7. The emergency stop switch according to claim 1, characterized in that the switch tongue spring is preloaded.

8. The emergency stop switch according to claim 1, characterized in that the switch tongue spring is designed configured as a spiral spring which is arranged concentrically around the switch tongue.

9. The emergency stop switch according to claim 1, characterized in that the switch tongue guide is formed in a switch tongue housing, and the switch tongue housing has a contact portion against which the force from the switch tongue spring acts.

10. The emergency stop switch according to claim 1, characterized in that the switch tongue has a support portion on which the switch tongue spring is supported.

11. The emergency stop switch according to claim 1, characterized in that the switch tongue has a guide bolt guided in a longitudinal guide of the cable pull mechanism.

12. The emergency stop switch according to claim 1, characterized in that, during operation, the equalizing spring is firmly clamped in a clamp or is configured to be firmly clamped in a clamp.

13. The emergency stop switch according to claim 1, characterized in that the switch mechanism applies a force along a first axis and the cable pull mechanism applies a force along a second axis, wherein the first axis and second axis are transverse to each other.

14. The emergency stop switch according to claim 1, characterized in that the switch mechanism and the cable pull mechanism are arranged in a single housing of the emergency stop switch.

15. The emergency stop switch according to claim 1, characterized in that the switch tongue-has a marking for adjusting a predetermined preload of the cable, the emergency stop switch having a viewing port for reading the marking.

16. A machine comprising an emergency stop switch having a switch mechanism with a manually operable switch and with a first contact element which is operatively connected to the switch, wherein the switch is configured, upon actuation of the switch, to bring the first contact element into contact with a second contact element to trigger an emergency stop function, and a cable pull mechanism with a switch tongue guided in a switch tongue guide, wherein the switch tongue-is configured to be connected to a first end of a cable, wherein a switch tongue spring preloads the switch tongue during operation in a direction away from the cable, wherein the cable is connected at its second end to an equalizing spring, wherein the first contact element is operatively connected to the switch tongue, wherein the switch tongue, when the preloaded cable is pulled, is guided in the switch tongue guide in the direction of the cable, opposing a spring force of the switch tongue spring, and brings the first contact element into contact with the second contact element in order to trigger the emergency stop function by means of the cable pull mechanism, wherein the second contact element is connected to the machine, thereby triggering the emergency stop function by means of the emergency stop switch causes the machine to stop.

* * * * *